(12) United States Patent
Urkowitz

(10) Patent No.: US 8,334,803 B1
(45) Date of Patent: Dec. 18, 2012

(54) METHOD FOR SIMULATING NOISY RADAR TARGET ECHOES

(75) Inventor: Harry Urkowitz, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 472 days.

(21) Appl. No.: 12/627,338

(22) Filed: Nov. 30, 2009

(51) Int. Cl.
*G01S 7/40* (2006.01)
(52) U.S. Cl. .......... 342/169; 342/165; 342/168
(58) Field of Classification Search .......... 342/165, 342/169–172
See application file for complete search history.

(56) References Cited

U.S. PATENT DOCUMENTS

| | | | | |
|---|---|---|---|---|
| 3,903,521 A * | 9/1975 | Jensen et al. | | 342/168 |
| 4,199,874 A * | 4/1980 | Koshevoi et al. | | 434/2 |
| 4,317,214 A * | 2/1982 | Attinello | | 455/1 |
| 4,560,987 A * | 12/1985 | Dochow et al. | | 342/171 |
| 4,591,858 A * | 5/1986 | Jacobson | | 342/169 |
| 4,625,209 A * | 11/1986 | Lawrence et al. | | 342/169 |
| 4,644,357 A * | 2/1987 | Schaaf et al. | | 342/168 |
| 4,969,819 A * | 11/1990 | James | | 434/5 |
| 4,982,196 A | 1/1991 | Thomas et al. | | |
| 5,160,264 A * | 11/1992 | Banura et al. | | 434/2 |
| 5,192,208 A * | 3/1993 | Ferguson et al. | | 434/2 |
| 5,262,787 A * | 11/1993 | Wilson et al. | | 342/173 |
| 5,341,146 A * | 8/1994 | Vennum et al. | | 342/170 |
| 5,392,050 A | 2/1995 | Guerci et al. | | |
| 5,431,568 A * | 7/1995 | Fey et al. | | 434/2 |
| 5,457,463 A * | 10/1995 | Vencel et al. | | 342/169 |
| 5,870,055 A * | 2/1999 | Kim | | 342/169 |
| 5,892,479 A * | 4/1999 | Mills et al. | | 342/172 |
| 5,973,638 A * | 10/1999 | Robbins et al. | | 342/172 |
| 6,075,480 A * | 6/2000 | Deliberis, Jr. | | 342/169 |
| 6,236,363 B1 * | 5/2001 | Robbins et al. | | 342/360 |
| 6,301,552 B1 * | 10/2001 | Gomez et al. | | 703/4 |
| 6,346,909 B1 * | 2/2002 | Johnson et al. | | 342/169 |
| 6,496,139 B1 | 12/2002 | Flacke et al. | | |
| 6,498,583 B1 * | 12/2002 | Tsai et al. | | 342/169 |
| 6,950,057 B1 * | 9/2005 | Mussell et al. | | 342/170 |
| 7,145,504 B1 * | 12/2006 | Newberg et al. | | 342/169 |
| 7,327,308 B2 * | 2/2008 | Cheng et al. | | 342/165 |
| 7,352,321 B2 | 4/2008 | Szajnowski et al. | | |
| 7,365,677 B2 | 4/2008 | Tsunoda | | |
| 7,430,413 B2 * | 9/2008 | Fleury et al. | | 455/423 |
| 2006/0244654 A1 | 11/2006 | Cheng et al. | | |

\* cited by examiner

*Primary Examiner* — Jack W Keith
*Assistant Examiner* — Peter Bythrow
(74) *Attorney, Agent, or Firm* — Howard IP Law Group, PC

(57) ABSTRACT

A method for determining target echo detection efficacy of a signal processing algorithm of a radar system involves generating a simulated noise complex envelope sequence, generating a simulated radar target echo signal complex envelope pulse sequence and adding the simulated noise complex envelope sequence to the simulated radar target echo signal complex envelope pulse sequence, thereby producing simulated noisy radar target echo signal complex envelope sequence. The simulated noisy radar target echo signal complex envelope sequence is inputted into the signal processing algorithm and the output of the signal processing algorithm is analyzed to determine target echo detection efficacy of the signal processing algorithm.

8 Claims, 11 Drawing Sheets

US 8,334,803 B1

METHOD FOR SIMULATING NOISY RADAR TARGET ECHOES

GOVERNMENTAL INTEREST

This invention was made with Government support under contract No. N00024-03-C-6110 awarded by the Department of Navy. The Government has certain rights in this invention.

CROSS-REFERENCE TO RELATED APPLICATION

None

FIELD OF THE INVENTION

This disclosure generally relates to simulation of radar detection behavior and more particularly to simulation of radar detection behavior using simulated Swerling and other models for target echo signals.

BACKGROUND

It is useful and important, in radar system design to know or estimate the detection capability and behavior of the radar system before a complete system design can proceed. An important aspect of the radar system's capability is in the determination of the efficacy of certain signal processing procedures, particularly the procedure known as "integration", both coherent and non-coherent integrations. The purpose of integration is to build up the value of a signal compared to the accompanying internal noise fluctuations, so that the presence of a target echo may be detected. In addition to target echo detection, it is also important to determine the properties of the signal processing algorithms that the radar system utilizes. Thus, there is a need for ways to determine the target echo detection efficacy and the properties of a radar system's signal processing algorithms through the use of simulated target echo signals so that the radar system's design and signal processing algorithms can be tested during the design stage of the radar system without physically realizing the radar system in a field testing environment.

SUMMARY

A method for determining target echo detection efficacy and properties of a radar system's signal processing algorithms through the use of simulated target echo signals is disclosed according to an implementation of the present disclosure. The method comprises generating simulated a noise complex envelope sequence representing a radar system's internal fluctuation noise; generating a simulated radar target echo signal complex envelope pulse sequence; and adding the simulated noise complex envelope sequence to the simulated radar target echo signal complex envelope pulse sequence, thereby producing a simulated noisy radar target echo signal complex envelope sequence. The simulated noisy radar target echo signal complex envelope sequence is then inputted to the radar system's signal processing algorithm and the output is analyzed to determine the signal processing algorithm's target echo detection efficacy and properties. The simulated noisy radar target echo signal complex envelope sequence provides realistic testing of the signal processing algorithm because the target echo signal is accompanied by the inevitable radar system internal fluctuation noise.

According to another implementation of the present disclosure, a method for simulating radar target echo signal is disclosed. The method comprises generating a simulated noise complex envelope sequence; generating a simulated radar target echo signal complex envelope pulse sequence; and adding the simulated noise complex envelope sequence to the simulated radar target echo signal complex envelope pulse sequence, thereby producing a noise-corrupted simulated signal complex envelope sequence.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein.

All drawings are schematic and are not intended to show any dimensions to scale.

DETAILED DESCRIPTION

This description of the preferred embodiments is intended to be read in connection with the accompanying drawings, which are to be considered part of the entire written description of this invention.

In determining target echo detection efficacy and properties of a radar system's signal processing algorithms through the use of simulated target echo signals, an important aspect is generating simulated radar target echoes that are realistic such that the signal processing algorithm can be tested using conditions that are as realistic as possible.

The signal processing algorithm can be provided in a signal processor or as a computer program loaded on a machine-readable storage medium. Thus, the signal processing algorithm for a radar system can be tested without an actual radar system by inputting the simulated target echo or echoes accompanied by the inevitable radar system internal fluctuation noise.

Since a radar system will inevitably be faced with various types of targets, it is desirable that the various types of radar targets be used in a simulation to determine appropriate design parameters. According to the present disclosure, simulating radar target echoes is performed at the level of complex envelope. This provides a simulated echo signal that is realistic because in the real world, noise get added to radar target echo signals at the complex echo level before envelope extraction by the radar system's signal processor. This disclosure describes how that can be done for almost any type of target echo fluctuation.

Figure 1:
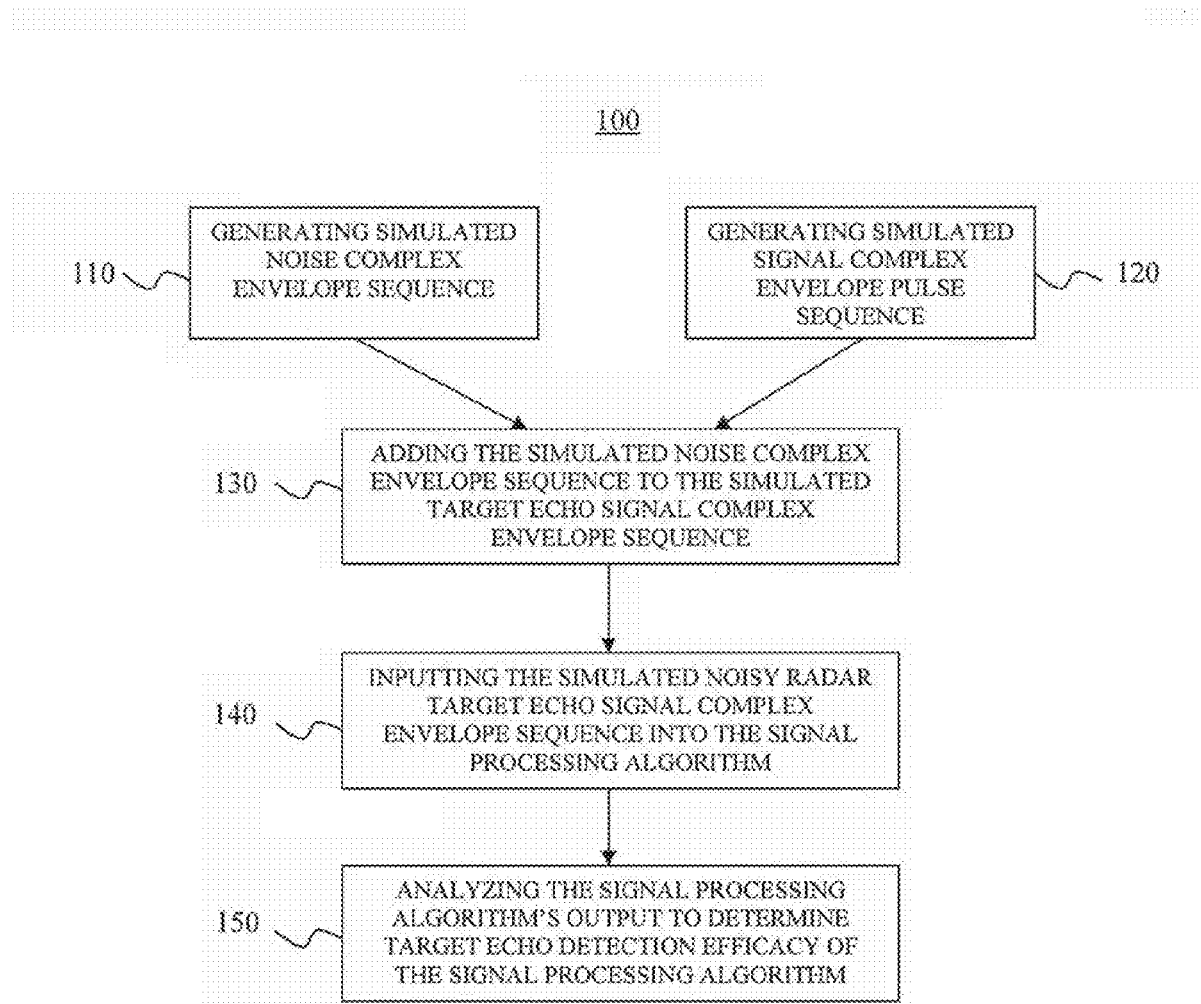
FIG. 1 is a flowchart illustrating the method of the present disclosure.

Referring to the flow chart 100 shown in FIG. 1, a method for determining target echo detection efficacy of a signal processing algorithm of a radar system is disclosed. The method comprises generating simulated a noise complex envelope sequence representing a radar system's internal fluctuation noise (see block 110); generating a simulated radar target echo signal complex envelope pulse sequence (see block 120); and adding the simulated noise complex envelope sequence to the simulated radar target echo signal complex envelope pulse sequence, thereby producing a simulated noisy radar target echo signal complex envelope sequence (see block 130). The simulated noisy radar target echo signal complex envelope sequence is then inputted to the radar system's signal processing algorithm (see block 140) and the output is analyzed to determine the signal processing algorithm's target echo detection efficacy and properties (see block 150). The simulated noisy radar target echo signal complex envelope sequence provides realistic testing of the signal processing algorithm because the target echo signal is accompanied by the inevitable radar system internal fluctuation noise.

In the present disclosure, emphasis is placed on the simulation of the traditional four Swerling models for radar cross section (RCS) fluctuations (i.e. target echo) and on the general chi-square type of RCS fluctuation. These models can be exactly simulated, with noise added properly, because the chi-square type of fluctuation, with an integral number of duo-degrees of freedom, arises out of complex Gaussian random variables that describe the complex envelopes. The simulation is done by starting with a number of complex Gaussian processes, adding the complex noise envelopes, and then adding the appropriate number of squares of the complex noise and signal mixtures.

The cases of non-integral duo-degrees of freedom and of arbitrary cross section fluctuations must be treated differently. The process consists of starting with a sequence of RCS values and taking the square root of these values to produce a sequence of amplitude values. These are then multiplied by the sine and cosine of an arbitrary angle to produce simulated signal complex envelopes. Complex Gaussian noise with zero mean and appropriate variance is added to the simulated signal complex envelope to produce the complex envelope of signal plus noise. The envelope of the complex envelope sums then produces the amplitude for subsequent noncoherent processing. Because of arbitrariness of the signal phase, one must be cautious in any processing before envelope extraction. However, the process is suitable for pulse to pulse coherent processing where initial signal phase is unimportant. For example, a Doppler shift may be imposed on the signal phases before adding the complex envelopes.

The final type of simulation considered is that of target motion (about the center of gravity) characterized by sinusoidal motion (or with a combination of sinusoids). Such motion is characteristic of precession and nutation. By treating these motions as having random starting phase (which is quite reasonable physically), the echo complex envelope is easily described, and fairly arbitrary motion can be simulated by starting with the complex covariance matrix, factoring it by a Cholesky decomposition, and using one of the factors to transform a sequence having uncorrelated elements into a sequence having the desired motions.

Of the four Swerling models, simulation of the Swerling II model is the simplest. The pulse-to-pulse fluctuations are statistically independent and their amplitudes have a Rayleigh probability density function. This means that the powers, i.e., squared amplitudes, have an exponential probability density function. The object here is to simulate such a variation at the complex envelope level, so that system noise (zero mean, Gaussian) can be added properly.

Any process that has a Rayleigh amplitude probability density function can arise only from a complex envelope process that is Gaussian whose real and imaginary parts have zero mean, equal variances and are statistically independent. Thus, the complex envelope process is the sum of two statistically independent, zero mean, Gaussian processes, one representing noise with variance $\sigma_n^2$ and the other representing the fluctuating signal with variance $\sigma_s^2$. The signal-to-noise (power) ratio (SNR) is simply the ratio of these two variances.

$$\text{SNR} = \sigma_s^2/\sigma_n^2 \qquad (2.1.1)$$

Some symbology is now required.

$\tilde{x}(t)$ = noise complex envelope $= x_c(t) + jx_s(t)$ $x_c(t)$ is commonly called the "I" component and $x_s(t)$ is commonly called the "Q" component. For signal plus noise, we provide a sequence of values.

$\tilde{x}(t_i): i = 1, 2 \ldots, N$ $\tilde{y}(t_i): i = 1, 2 \ldots, N \qquad (2.1.2)$ For regularly spaced pulses, the $t_i$ will be regularly spaced. The variances of the complex envelopes are:

$$\sigma_{\tilde{x}}^2 = 2\sigma_{x_c}^2 = 2\sigma_{x_s}^2 = 2 \times \text{noise "power"} \qquad (2.1.3)$$

$$\sigma_{\tilde{y}}^2 = 2\sigma_{y_c}^2 = 2\sigma_{y_s}^2 = 2 \times \text{noise "power"} \qquad (2.1.4)$$

$$\text{SNR} = \sigma_s^2 \sigma_n^2 = \sigma_{\tilde{y}}^2/\sigma_{\tilde{x}}^2 \qquad (2.1.5)$$

According to the Swerling II model, the $\tilde{x}(t_i)$ are statistically independent, zero mean, Gaussian random variables with variance (2.1.3). The $\tilde{y}(t_i)$ are statistically independent, zero mean, Gaussian random variables with variance (2.1.4).

In all discussion to follow, the nature of $y(t_i)$ may change, depending on the signal fluctuation model for the target echo signal. But the noise $\tilde{x}(t_i)$ always has independent pulse-to-pulse fluctuations, regardless of the target fluctuation model.

Figure 2:
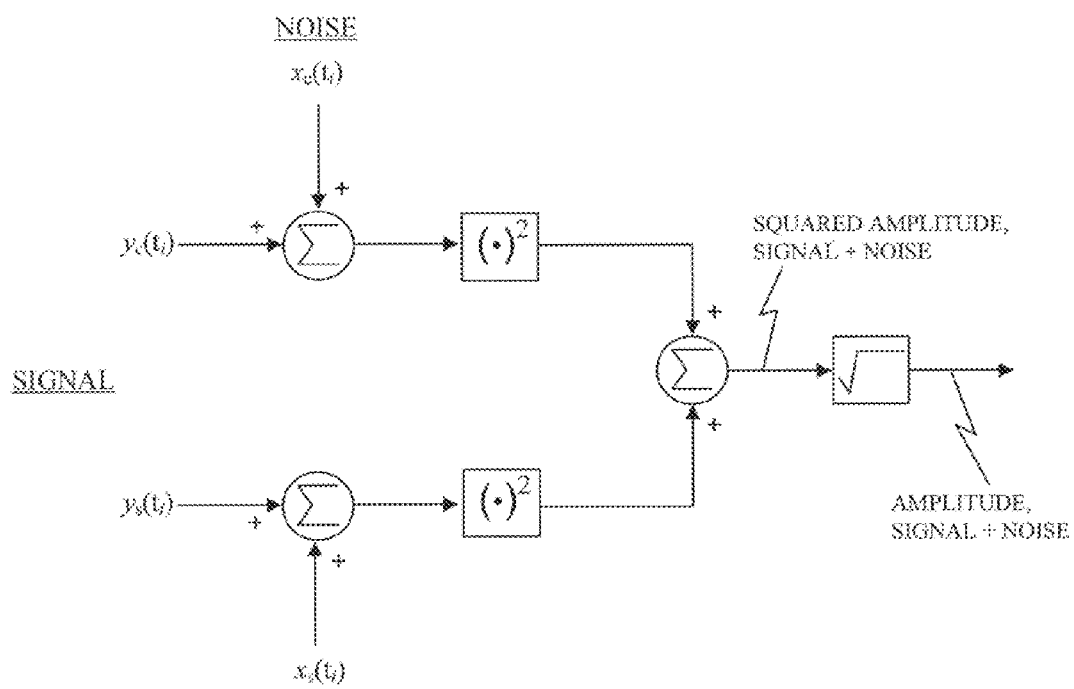
FIG. 2 illustrates a block diagram of the method for simulating signal plus noise.

FIG. 2 shows a block diagram of the method for simulating target echo signal plus noise. In the block diagram, the $t_i$ are time of the element sequences: $i = 1, 2 \ldots, N$. The noise sequence always has statistically independent elements. The statistics of the signal sequence depend on the target fluctuation model. The $x_c(t_i)$ and $x_s(t_i)$ are the real and imaginary parts of the noise complex envelope. Similarly, the $y_c(t_i)$ and $y_s(t_i)$ are the real and imaginary parts of the target echo signal. This block diagram applies to the simulation of any type of signal fluctuation. The thing that changes is the nature of the signal fluctuation.

Continuing with the Swerling II model for target echo signal fluctuation, we refer to FIG. 2. The Swerling II model requires that, in each sequence of complex envelopes, $$\tilde{y}(t_i), i=1, 2 \ldots, N \quad (2.1.6)$$

the terms are statistically independent Gaussian random variables as described above. This model has been described as the "noise-in-noise" model. The Gaussian random variables may be created, in a simulation program, by the appropriate MATLAB program or by appropriate algebraic transformation of a sequence of pairs of uniformly distributed, statistically independent, random variables.

Next we consider the Swerling I model for target echo fluctuation. For the Swerling I model, we must create signal complex envelopes that show constancy in amplitude over N pulses, but vary over a group of N pulses in each group. Referring to FIG. 2, and the equation (2.1.2), we may index each block of N pulses with the index k:

$$K=1, 2 \ldots, M \quad (2.2.1)$$

where M is the number of groups or blocks, each block having N signal pulses that are all the same. So we may show this by writing the signal as: $\tilde{y}_k(t_i)$ $$\tilde{y}_k(t_i) = \tilde{a}_k; i=1, 2, \ldots, N; k=1, 2, \ldots, M \quad (2.2.2)$$

where M is the number of blocks. As k varies, the $\tilde{a}_k$ are chosen from a complex Gaussian process with zero mean and variance $\sigma_{\tilde{y}}^2$.

Noncoherent integration takes place over a block of N pulse echoes and each noncoherent integration result is the test statistic that is applied to a threshold to get (or not get) a target detection. In any simulation, a large number of such threshold applications is made in order to get statistics on detection probability. That is, M must be a large number, because M is the number of Monte Carlo replications.

Next we consider the Swerling IV model target echo fluctuation. The Swerling IV fluctuation has statistical independence from pulse-to-pulse over the group of N pulses. In this case, however, the pulse-to-pulse fluctuations have a gamma (unnormalized chi-square) probability density function with four degrees of freedom or two duo-degrees of freedom in the power or squared amplitude. A different way of saying this is that the squared amplitude, or power, is the sum of two statistically independent exponentially distributed random variables. Each of these components can be looked at as a Rayleigh variate in its amplitude or envelope. The complex envelope of each component is a zero mean complex Gaussian random variable whose variance is one half of the total variance. The simulation of such a target echo, with noise, is more involved than in the case of Swerling I and II models.

There are at least three ways in which this simulation may be accomplished. If the noise was not being included in the simulated target echo signals, all of the methods would produce the same result for the chi-square (i.e., gamma) fluctuation of squared envelope. The present disclosure describes the ways for simulating the signal and the noise and combining the two to produce simulated target echo complex envelope that realistically simulates signal plus noise. The combining of the simulated signal and simulated noise takes place at the level of complex envelope.

Next we address simulating the Swerling III and Swerling IV models. The Swerling III and Swerling IV amplitude values are the square roots of a random variable that has a gamma (unnormalized chi-square) probability density function. Such a probability density has two parameters: (a) Number of degrees of freedom, and (b) Scale parameter. The gamma density can be formed from the sum of a number of squares of real Gaussian, zero mean, random variables that have the same variance. The number of degrees of freedom is the number of Gaussian random variables whose squares are the terms in the sum. It is of interest to see just how this sum operates.

Let $$\gamma_M = \sum_{k=1}^{M} Z_k^2 \quad (2.3.1)$$

where the $Z_k$ are real, zero mean, statistically independent, Gaussian random variables, each with variance $\sigma^2$. The random variable $\gamma_M$ is said to be a gamma random variable with M degrees of freedom and scale factor $\sigma^2$. For the sake of completeness, the probability density function is:

$$P_{\gamma_M}(u) = \frac{u^{(M/2)-1} \exp(-u/2\sigma^2)}{2^{M/2} \Gamma(M/2) \sigma^M}, u \geq 0, \sigma > 0 \quad (2.3.2)$$

$$= 0, u < 0$$

The Swerling III and IV cases have target fluctuations that are gamma distributed with each term having 4 degrees of freedom or, as often stated, 2 duo-degrees of freedom. The reason is that each complex envelope yields two real variables and each of these real variables contributes to the number of degrees of freedom. We can express the sum in equation (2.3.1) in the form of complex envelopes by referring to the discussion on Swerling I model above. The squared magnitude of each complex envelope sample $\tilde{y}(t_i)$ yields the squares of two variables $$|\tilde{y}(t_i)|^2 = y_c^2(t_i) + y_s^2(t_i) \quad (2.3.3)$$

Figure 3A:
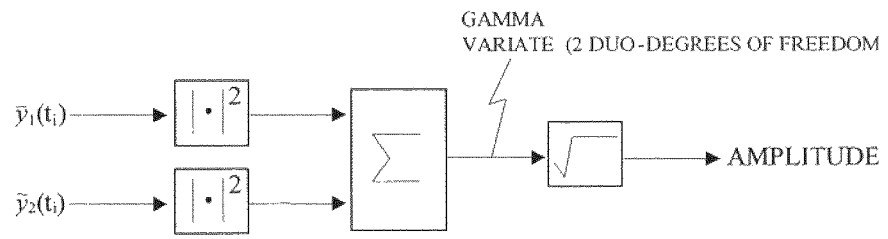
FIG. 3A illustrates a block diagram of the method for creating Swerling III or IV target fluctuation, noiseless case.

Thus, if we write $$\sum_{k=1}^{2} |\tilde{y}_k(t_i)|^2 = \sum_{k=1}^{2} [y_{ck}^2(t_i) + y_{sk}^2(t_i)] \quad (2.3.4)$$

we see that the sum on the left hand side is a gamma random variable with 2 duo-degrees of freedom and scale factor $\sigma_{\tilde{y}}^2/2$, since each of the sums on the right hand side has terms with variance $\sigma_{\tilde{y}}^2/2$. The equation (2.3.3) shows how signal amplitude can be produced in the absence of noise. The method is illustrated in FIG. 3A in complex envelope terms and in FIG. 3B in real terms. $\tilde{y}_1(t_i)$ and $\tilde{y}_2(t_i)$ are each just like the $\tilde{y}_2(t_i)$ of the equation (2.1.2) in the Swerling I case described above. One may see that input to the square root block is a gamma variate with two duo-degrees of freedom and a scale factor $\sigma_{\tilde{y}}^2/2$, the common variance of all the real components.

Figure 3B:
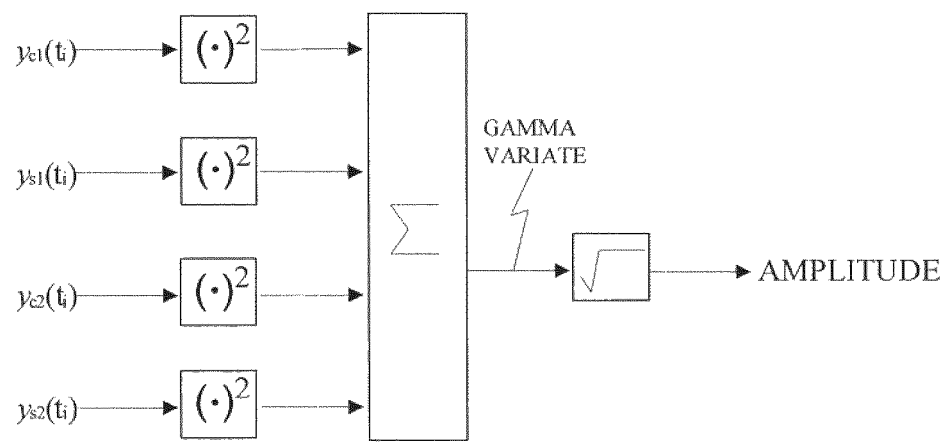
FIG. 3B illustrates the block diagram of FIG. 3A expressed in real terms.

As indicated in FIG. 3A, the nature of the $\tilde{y}_1(t_i)$ and $\tilde{y}_2(t_i)$ will determine whether the fluctuation is Swerling III or Swerling IV. For Swerling III, the values of $\tilde{y}_1(t_i)$ and $\tilde{y}_2(t_i)$ are constant for all $t_i$, $i=1, 2 \ldots, N$. For Swerling IV, the values of $\tilde{y}_1(t_i)$ fluctuate from pulse-to-pulse with the gamma variation with 1 duo-degree of freedom as does $\tilde{y}_2(t_i)$. $\tilde{y}_1$ and $\tilde{y}_2$ are statistically independent, zero mean, complex Gaussian processes with equal variance. Their expression in real terms is shown in FIG. 3B. In FIG. 3B, $y_{c1}(t_i)$, $y_{s1}(t_i)$ are real and imaginary parts of $\tilde{y}_1(t_i)$. $y_{c2}(t_i)$, $y_{s2}(t_i)$ are real and imaginary parts of $\tilde{y}_2(t_i)$.

Next we consider adding simulated noise to the simulated Swerling III and IV models of target echo fluctuations. The simple descriptions of Swerling III and Swerling IV fluctuations do not tell how the noise is added to the signal at the complex envelope level. We must make some assumptions as to how this may be done. There are at least three ways that the noise may be incorporated which are described herein. Of the ways that noise may be incorporated, the last method can be used for any cross section fluctuation, even empirical or observed cross sections.

Figure 4A:
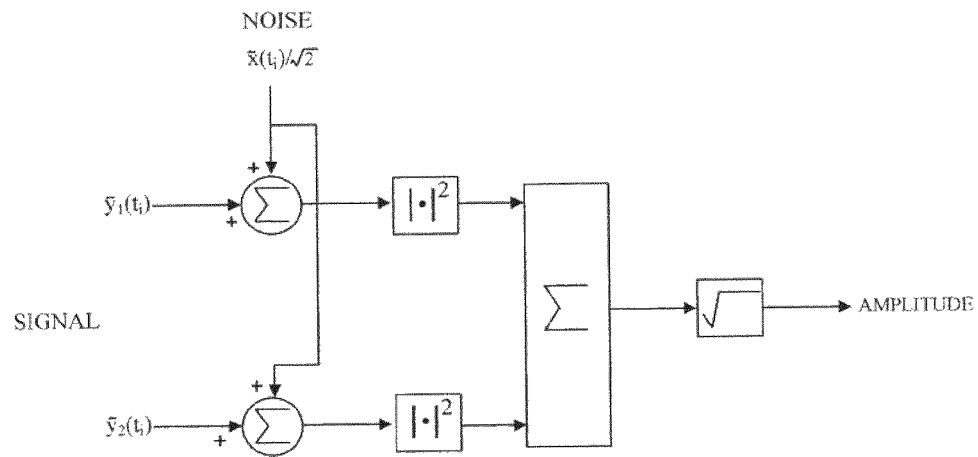
FIG. 4A illustrates a block diagram of one method for introducing noise to two components of Swerling III and Swerling IV target fluctuation signal complex envelopes.

We first consider the case where the noise input is common to both complex envelopes of the simulated signal. This is illustrated in FIG. 4A. Here the common noise has complex envelope $\tilde{x}(t_i)$. The several complex envelopes are:

Signal: $\tilde{y}_1(t_i)$, zero mean, variance=$\sigma_{\tilde{y}_1}^2$

Noise: $\tilde{y}_2(t_i)$, zero mean, variance=$\sigma_{\tilde{y}_2}^2 = \sigma_{\tilde{y}_1}^2 = 2\times$variance of real (or imaginary) part (3.1.1)

$\tilde{x}(t_i)$, variance $\sigma_{\tilde{x}}^2 = 2\times$variance of real (or imaginary) part (3.1.2)

Signal-to-noise ratio:

$$\frac{2\sigma_{\tilde{y}_1}^2}{\sigma_{\tilde{x}}^2} = 2 \times (SNR \text{ of either component}) \quad (3.1.3)$$

The reason for the factor 2 in the equation (3.1.3) is that there are two components to the signal complex envelope and the total signal variance (i.e., power) is the sum of the powers of the components.

A question might arise about the phasing of the signal components. Note that the signal powers (after magnitude squaring) are added and, thus, the phases have no contribution here. The total signal variance (i.e., power) is thus twice the variance of either component, resulting in the equation (3.1.3).

Figure 4B:
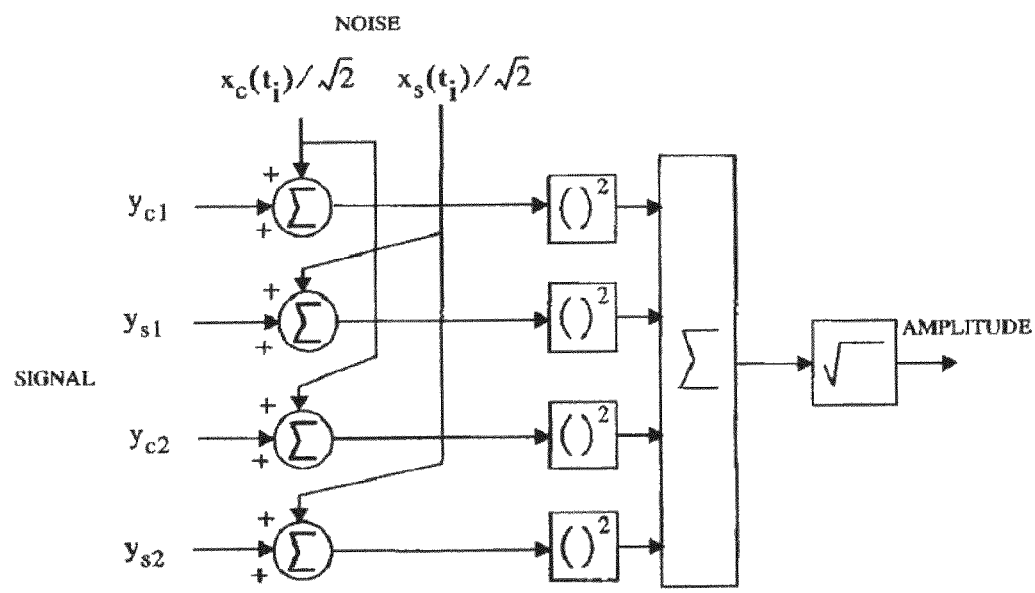
FIG. 4B illustrates the block diagram of FIG. 4A expressed in real terms.

It is useful to express the signal and noise contributions in real terms, as well as in complex envelope terms. This is done in FIG. 4B for the case of a common noise source for both complex envelope signal components. The signal-to-noise ratio differs from that of the equation (2.1.5) because the total real signal variance is twice that of either component. Thus, we may write, as total signal variance, $\sigma_s^2 = \sigma_{s1}^2 + \sigma_{s2}^2 = 2\sigma_{s1}^2 = 2\sigma_{s2}^2$ (3.1.4)

Figure 5A:
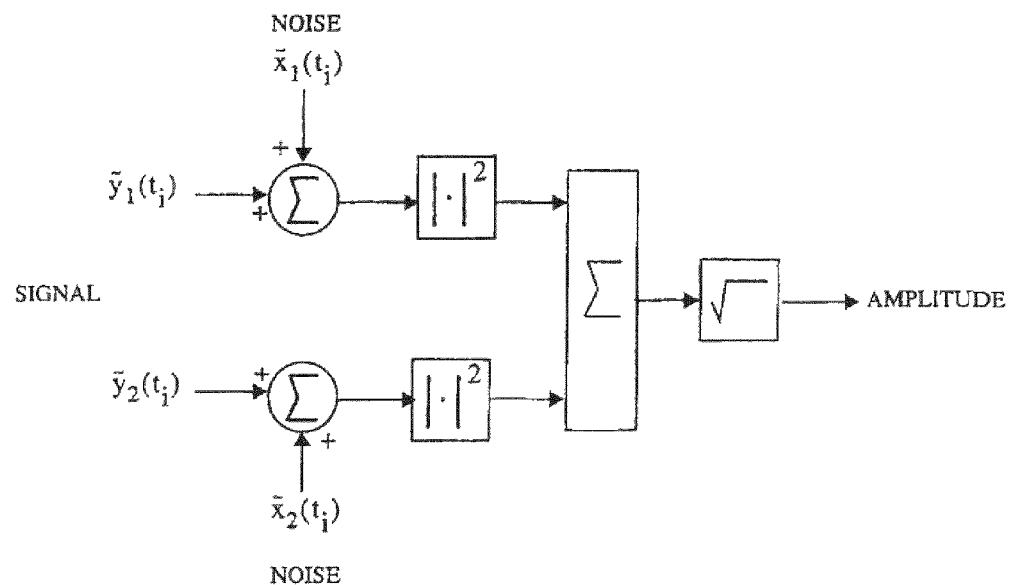
FIG. 5A illustrates an alternative method of introducing noise complex envelope to Swerling III and IV target fluctuations. $\tilde{x}_1(t_i)$ and $\tilde{x}_2(t_i)$ are complex envelopes of statistically independent, zero mean, Gaussian processes, with equal variances.

According to another aspect of the present disclosure, the noise input to each of the components of the signal complex envelope may not be common but from separate noise sources. FIG. 5A is a block diagram showing the two noise complex envelopes being added to the two components of the signal complex envelope. The complex envelopes of the two noise sources are $\tilde{x}_1(t_i)$ and $\tilde{x}_2(t_i)$ The two sources are statistically independent and each is a zero mean, complex Gaussian random process, with the same variance as the other. Calling this common variance $\sigma_{\tilde{x}}^2$, the signal-to-noise ratio is $$SNR = \frac{2\sigma_{\tilde{y}}^2}{\sigma_{\tilde{x}}^2} \quad (3.2.1)$$

where $\sigma_{\tilde{y}}^2$ refers to the common variance of $\tilde{y}_1$ and $\tilde{y}_2$.

Figure 5B:
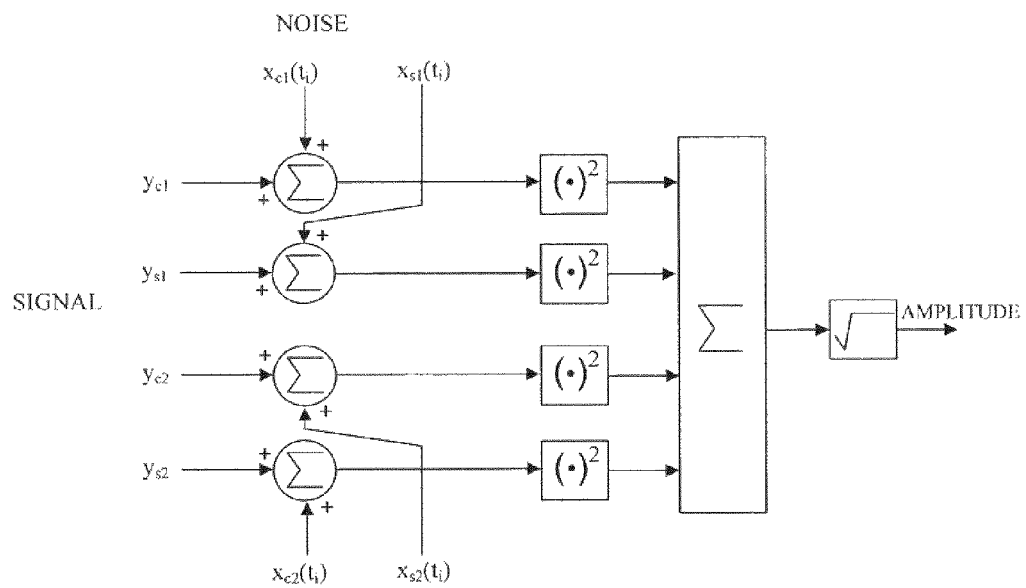
FIG. 5B shows the block diagram of FIG. 5A expressed in real terms.

FIG. 5B shows the signal and noise combination expressed in real terms. The real variances for noise and signal are, respectively $\sigma_{x_1}^2$, $\sigma_{x_2}^2$ and $\sigma_{y_1}^2$, $\sigma_{y_2}^2$, and the signal-to-noise ratio is $$SNR = \frac{2\sigma_{y_1}^2}{\sigma_{x_1}^2} = \frac{2\sigma_{y_2}^2}{\sigma_{x_2}^2} \quad (3.2.2)$$

Regarding the noise contribution, when Swerling introduced his target fluctuation models I-IV as well as the general chi-square fluctuation models, his purpose was to provide formulas for false alarm and detection probabilities. Therefore, in the Swerling model formulas, the variable was the ratio of signal power to noise power, and since the noise was presumed to have constant power, the signal-to-noise ratio varied exactly as the signal power varied. The Swerling formulas therefore had no need for determining how noise entered at the complex envelope level.

In order to determine detection properties in the presence of radar system's internal noise and additional external sources of interference, such as sporadic electromagnetic emission from other radiators, simulation according to the present disclosure is necessary. In an actual situation, each pulse is accompanied by a noise sample. No matter what the pulse-to-pulse target echo may be, the noise (at the complex envelope level) is added to the total signal complex envelope. This is the method for adding noise to the target echo signal complex envelope shown in FIGS. 4A and 4B according to one embodiment of the present disclosure.

(General Chi-Square Cross Section Fluctuation)—The method described above can be extended to any chi-square (i.e., gamma) cross section fluctuation. What must be known is the value of the number of duo-degrees of freedom for each pulse and the block character of the fluctuation. Let k=no. of duo degrees of freedom, each pulse
F=number of equal amplitudes per block
N=total number of pulses per dwell
K=total number of duo-degrees of freedom.

Then,

K=Fk (4.0.1)

and the number of pulses in each block is

N/F (4.0.2)

Figure 6A:
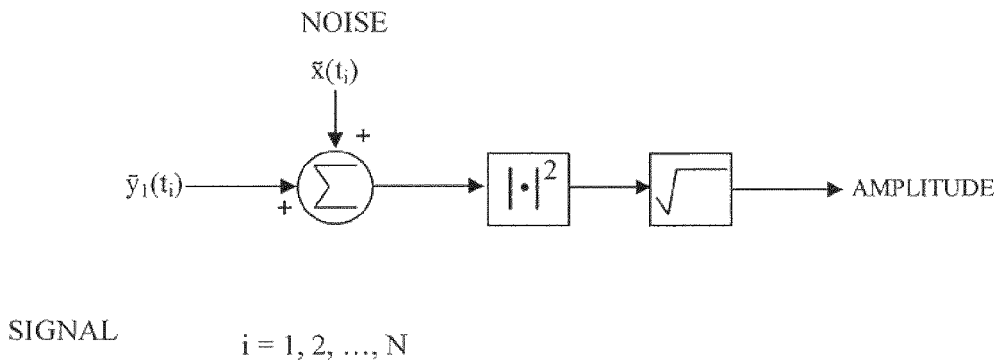
FIG. 6A illustrates the process of adding noise to the target echo signal at complex envelope level in a radar scan block correlated case where Swerling I fluctuation per block is assumed.

To simulate this situation, it is necessary to simulate each block separately and in parallel with the others. The process is illustrated in FIG. 6A. In the cases treated in this memorandum, the values of k are limited to:

k=1 k=2 (4.0.3)

That is, within each block, the target is either a Swerling I or Swerling III, but from block to block, there are statistically independent fluctuations. This also means the F divides N:

N/F=integer (4.0.4)

Figure 6B:
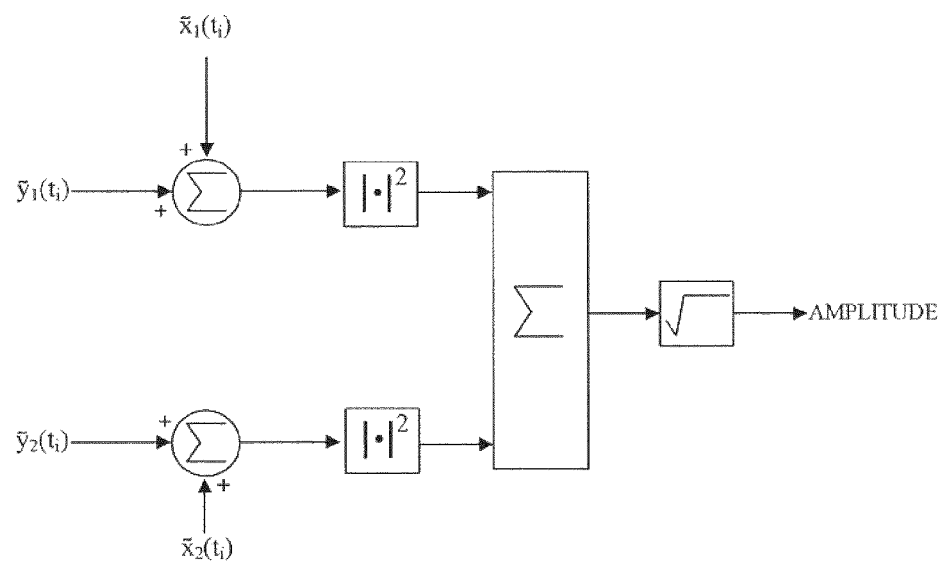
FIG. 6B illustrates the process of adding noise to the target echo signal at complex envelope level in a radar scan block correlated case where Swerling III per block is assumed.

Block diagrams showing how the noise may be added to the target echo are shown in FIGS. 6A and 6B. FIG. 6A refers to the case where the fluctuation within a block has k=1 for each pulse and there is statistical independence from block to block. The variance of the process $\tilde{y}_1(t)$ is $\sigma_{\tilde{y}}^2$ and the variance of the noise process is $\sigma_{\tilde{x}}^2$. The signal-to-noise ratio is $$\text{SNR} = \sigma_{\tilde{y}}^2 / \sigma_{\tilde{x}}^2 \tag{4.0.5}$$

FIG. 6A illustrates how the noise is added to the target echo signal at complex envelope level. This example illustrates a radar scan block correlated case where Swerling I fluctuation per block is assumed and $\tilde{x}(t_i)$ is the noise. The values for $t_i$, i=1, 2 ..., N, are drawn from a complex, zero mean, gaussian process with variance $\sigma_{\tilde{x}}^2$. The signal values are block correlated into blocks of f blocks of N/F pulses in each block. The values of $\tilde{y}_1(t_i)$ are drawn from a complex, zero mean gaussian process with variance $\sigma_{\tilde{y}}^2$. The values of $\tilde{y}_1(t_i)$ are grouped as follows:

$\tilde{y}_1(t_i)$ are constant over each block:
$\tilde{y}_1(t_1) = \tilde{y}_1(t_2) = \ldots = \tilde{y}_1(t_{N/F})$
$\tilde{y}_1(t_{N/F+1}) = \ldots = \tilde{y}_1(t_{2N/F})$.

FIG. 6B illustrates a case where the fluctuation within a block has k=2 for each pulse and there is statistical independence from block to block, i.e. Swerling III per block. The variance of the signal process is $\sigma_{\tilde{y}_1}^2 + \sigma_{\tilde{y}_2}^2$ but the signal-to-noise ratio is $$\text{SNR} = \sigma_{\tilde{y}1}^2 / \sigma_{\tilde{y}}^2 \tag{4.0.6}$$

The values of $\tilde{y}_1(t_i)$ and $\tilde{y}_2(t_i)$ are each similar to $\tilde{y}_1(t_i)$ of FIG. 6A but the $\tilde{y}_1(t_i)$ are statistically independent from the $\tilde{y}_2(t_i)$ and each has the same variance $\sigma_{\tilde{y}}^2$.

(Non-Integral Values of k)—Of particular interest here is the case of so-called Weinstock models in which value of k such that k<1 or, in general, k≠integer. In such cases the equation (4.0.1) yields $$K = \text{non-integer.} \tag{4.1.1}$$

The general form of the gamma (generalized chi-square) probability density function is $$p(v) = \frac{v^{M/2-1}\exp(-v/2\sigma^2)}{2^{M/2}\Gamma(M/2)\sigma^M}, \; v > 0, \; \sigma > 0 \tag{4.1.2}$$

$$= 0, \; v < 0,$$

where M is the number of degrees of freedom and M/2 is the number of duo-degrees of freedom. For one pulse, M/2 corresponds to k. The mean and variance of the random variable v are $$E(v) = M\sigma^2$$

$$\text{var}(v) = 2M\sigma^4, \tag{4.1.3}$$

so that $$\frac{2[E(v)]^2}{\text{var}(v)} = M. \tag{4.1.4}$$

It does not appear possible to construct, theoretically, the complex envelope of a process whose squared envelope has the probability density as shown in the equation (4.1.2) with non-integral values of M/2, starting with Gaussian complex envelopes. Instead, we shall have to fall back on a general method of constructing the real and imaginary parts when we have a statistical description of the cross section or empirically measured cross sequences. This general method is treated below.

Before that is done, however, examine the simulations of a random fluctuation that does not fit into any of the "block correlated" models described above. It must be remembered that the block correlated models were introduced as approximations to more general fluctuation than any of those described by the Swerling models. The more general Swerling, or "chi-square", models that have an integral value for k, the "per-pulse duo degrees of freedom", can be simulated as described so far in this report. However, other forms of fluctuation cannot be simulated by means of underlying Gaussian complex envelopes. Among them are the cases of non-integral values of k, as mentioned above. In all cases, whatever model one uses for cross section fluctuations, even those that are empirically based must be somehow reduced to a model of complex envelope fluctuations. This is necessary if the addition of noise is to be made properly. That is, noise is added to the signal at the complex envelope, if any nonlinear "mixing" of signal and noise is to be avoided.

(A Model Showing "Partial Coherence")—The term "partial coherence" has been applied to those fluctuations that may exhibit pulse-to-pulse fluctuations that have some phase "coherence". Then some "build-up" of signal-to-noise ratio may be obtained by coherent integration; i.e., pulse-to-pulse addition of complex envelope or addition where the phases are included. One important purpose for this model is to determine the benefits, if any, of pulse-to-pulse coherent integration. The value of such integration, compared to noncoherent integration, is dependent on the steadiness or regularity of the pulse-to-pulse phase progression. This requires a knowledge of the pulse-to-pulse complex envelope progression.

As far as modeling of target fluctuation is concerned, it is the intrinsic variation that matters and that is what we want to model. It is not enough to describe the complex envelope variation in terms of its autocorrelation function. In order to simulate radar target echo, it is necessary to produce the pulse-to-pulse statistical probability density function. In order to determine, analytically that probability density function, description of the autocorrelation function is not enough. The underlying probability density function must be known or assumed in order to simulate the process.

Figure 7:
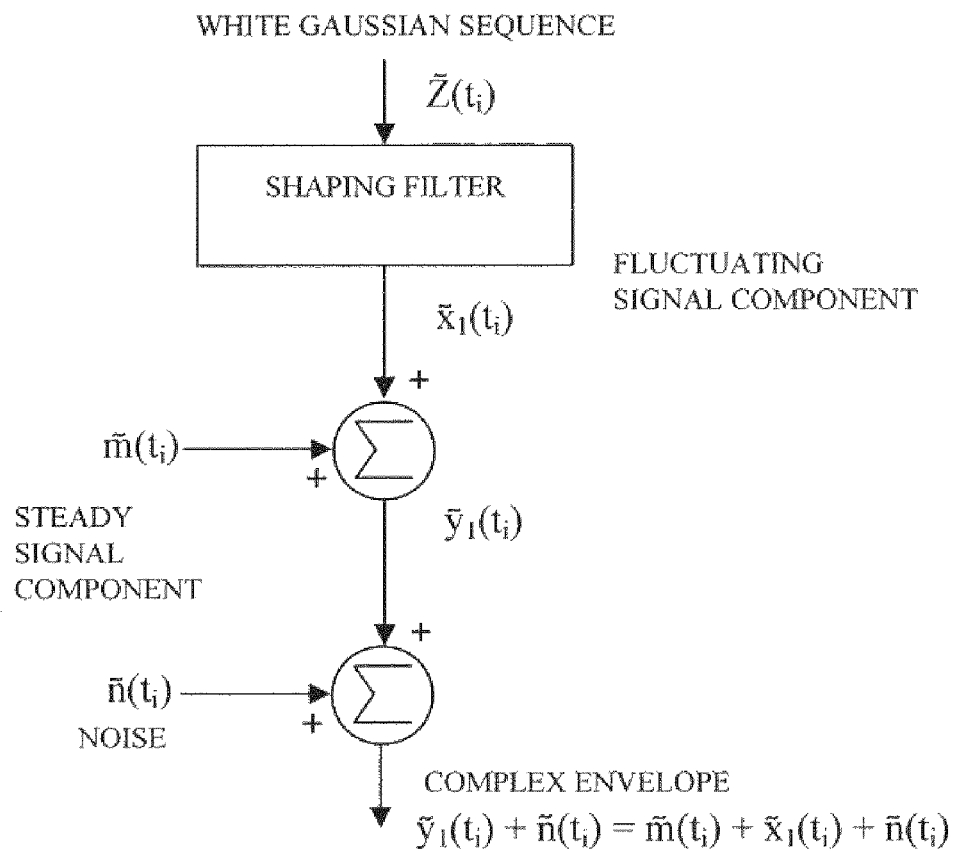
FIG. 7 illustrates the process of adding noise to the general complex envelope case.

(A General Complex Envelope)—The assumption made here is that complex envelope is the sum of a deterministic term and a randomly varying term:

$$\tilde{y}(t) = \tilde{m}(t) + \tilde{x}(t), \; t = iT; \; i = 1, 2, \ldots, N, \tag{5.1.1}$$

where $\tilde{x}(t)$ is a zero mean, wide sense stationary, Gaussian random process with autocorrelation function $R_{\tilde{x}}(\tau)$. $\tilde{m}(t)$ is the deterministically varying part of the complex envelope. $\tilde{m}(t)$ is taken to describe the deterministic fluctuation intrinsic to the body and not due to any translational motion of its center of gravity. For example, $\tilde{m}(t)$ might be taken to describe a sinusoidal or other regular variation of the body's orientation with respect to the radar. This is illustrated in FIG. 7. All quantities are complex envelopes. $\tilde{m}(t_i)$ is a constant if there is no deterministic variation. The frequency characteristic of the shaping filter is proportional to the power density spectrum of $\tilde{x}(t_i)$. $\tilde{Z}(t_i)$ is a Gaussian sequence with statistically independent terms.

The fluctuating component $\tilde{x}(t_i)$ has an autocorrelation function given by $R_{\tilde{x}}(\tau)$, $\tau = kT$. This may be produced as indicated in FIG. 7, with a shaping filter whose input is a complex white Gaussian sequence $\tilde{Z}(t)$ with statistically independent elements. (This is the same as saying "white"). The value of its variance is considered below. The transfer function H(f) has a squared magnitude proportional to the Fourier transform of $R_{\tilde{x}}(kT)$. The phase of the transfer function is arbitrary. The detailed design of such a filter is a well-known procedure and will not be discussed here. However, it is important to discuss signal-to-noise ratios and this is done below.

The deterministic component $\tilde{m}(t_i)$ may take on many forms. The simplest form is that of a constant.

$$\tilde{m}(t_i)=\tilde{m}, \text{ for all } t_i \tag{5.1.2}$$

The next most simple form is that in which the variation is sinusoidal:

$$\tilde{m}(t_i)=|\tilde{m}| \exp(j\omega_0 t_i) \tag{5.1.3}$$

The equation (5.1.3) does not refer to any translational motion. It has only to do with the target variation around its center of gravity. For example, $\tilde{m}(t_i)$ could describe changes in reflectivity as a result of spinning and precession. In such a case, there may be more than one frequency component. Any translational motion would be superposed on $\tilde{m}(t_i)$. The framework of the equation (5.1.1) can be made to include the translational motion of the target by enlarging the meaning of $\tilde{m}(t_i)$ to include the range variation caused by center of gravity motion.

(Arbitrary and Empirical Cross Sections)—The problem in specifying RCS fluctuations lies in the necessity to create or simulate radar echoes together with the system noise that inevitably accompanies such echoes. At the level of observed cross section, the noise is nonlinearly "mixed" with echo signal and cannot then be separated. If one knows or can create RCS values and does not have information concerning complex envelope, the noise can be introduced to the echo signal by the method described below. The approach is equally applicable to the cases:
  i. A specified fluctuation model for RCS; and
  ii. Empirically obtained RCS, e.g., measurements made in the field, operationally, or on a test range.

The only requirement for the second case above is that the RCS values are free or nearly free of system noise. That is, the measured RCS values have sufficiently high signal-to-noise ratio that they may be considered noise free. The approach will be to create, artificially, the complex envelopes from the RCS values and add system noise at the level of complex envelope. In this way, the actual way in which system noise accompanies a signal can be properly simulated.

As one may see from the equation (5.1.1), our interest lies in the pulse-to-pulse fluctuation, implying that our concern is with pulse-to-pulse operations, such as pulse-to-pulse integration (coherent and/or noncoherent). Actual pulse shapes, such as occur after pulse compression, are not of importance in the simulations considered in this report. The times of interest are iT, multiples of the repetition period T (or any other set of discrete time instants).

As we have done earlier, we denote the sequence of signal complex envelopes by $$\tilde{y}(t_i), t_i=iT. \tag{6.0.1}$$

The RCS represented by this complex envelope is proportional to $$|\tilde{y}(t_i)|^2. \tag{6.0.2}$$

We denote the RCS by $B(t_i)$, so we may replace the equation (6.0.2) by $B(t_i)$ such that $$B(t_i) \sim |\tilde{y}(t_i)|^2. \tag{6.0.3}$$

We may write the equation (6.0.1) as $$\tilde{y}(t_i)=y_c(t_i)+jy_s(t_i). \tag{6.0.4}$$

Then $$B(t_i)=y_c^2(t_i)+y_s^2(t_i), \tag{6.0.5}$$

where we have replaced the proportionality in the equation (6.0.3) by the equality in the equation (6.0.5). An amplitude function would be proportional to the magnitude of $\tilde{y}(t_i)$ and thus proportional to the square root of $B(t_i)$. We may write $$\tilde{y}(t_i)=\sqrt{y_c^2(t_i)+y_s^2(t_i)}\, \exp[j\theta(t_i)], \tag{6.0.6}$$

where $$\theta(t_i)=\arctan(y_s(t_i)/y_c(t_i)) \tag{6.0.7}$$

$$\tilde{y}(t_i)=\sqrt{B(t_i)}\, \exp(j\theta(t_i)) \tag{6.0.8}$$

$$=A(t_i)\exp(j\theta(t_i)). \tag{6.0.9}$$

Since $A(t_i)$ will be known, we need $\theta(t_i)$ in order to construct the complex envelope $\tilde{y}(t_i)$. The question is: What choice do we make for $\theta(t_i)$? In the absence of additional information, I propose that we make the choice $$\theta=0 \tag{6.0.10}$$

yielding $$y_c(t_i)=A(t_i)$$

$$y_s(t_i)=0. \tag{6.0.11}$$

Figure 8A:
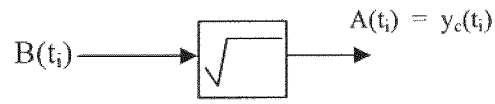
FIGS. 8A and 8B illustrate simulating the complex envelope of signal plus noise according to equations (6.0.6)-(6.0.11).
Figure 8B:
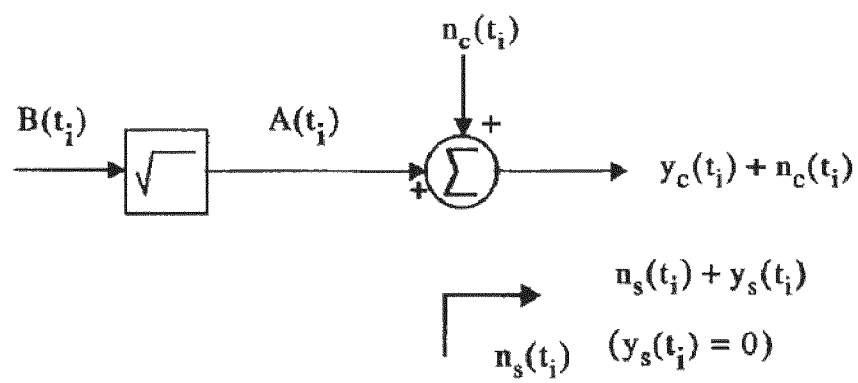
Figure 8C:
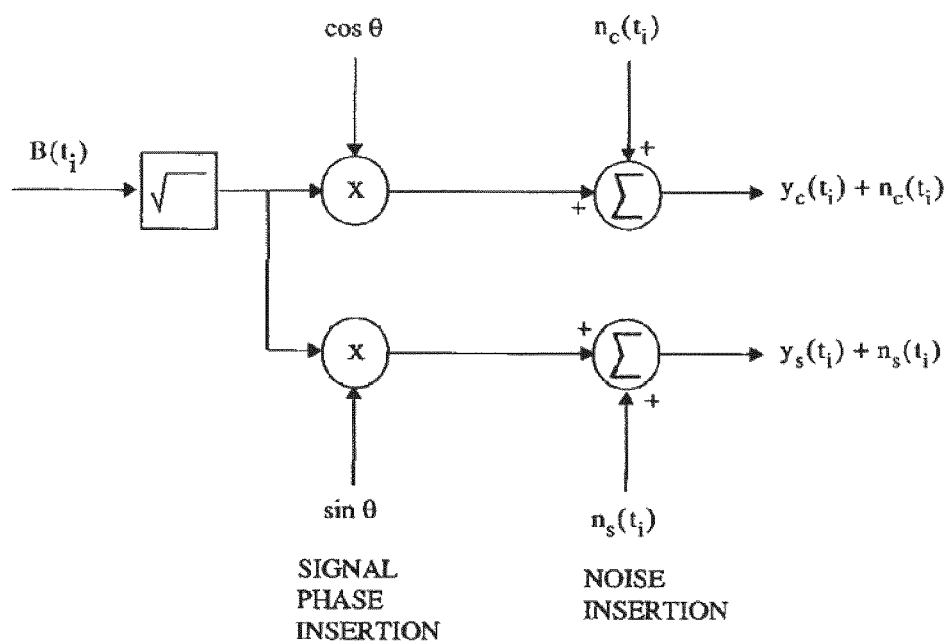
FIG. 8C shows an alternative methods to the process shown in FIGS. 8A and 8B.

FIGS. 8A and 8B illustrate the signal complex envelope as described by the equations (6.0.6)-(6.0.8) being constructed by using the equations (6.0.10)-(6.0.11). Because of the choice of signal phase (=0), the signal complex envelope has only a real part. $B(t_i)$ is proportional to RCS. In FIG. 8B, addition of noise to the signal complex envelope. $n_c(t_i)$, $n_s(t_i)$ are the real and imaginary parts of the noise complex envelope. Simulating the complex envelope of signal plus noise. (See e.q.'s (6.0.6)-(6.0.11)). The noise complex envelope is $\tilde{n}(t_i)=n_c(t_i)+jn_s(t_i)$. FIG. 8C shows an alternative methods to the process shown in FIGS. 8A and 8B. The signal phase $\theta$ is arbitrary. An engineer may feel uncomfortable setting $\theta(t_i)=0$. In that case, one may be more comfortable by setting $\theta$ to some value other than 0 or $\pi$ radians. If so, one would replace the equation (6.0.11) by $$y_c(t_i)=A(t_i)\cos\theta$$

$$y_s(t_i)=A(t_i)\sin\theta \tag{6.0.12}$$

with $\theta$ chosen to be other than 0 or $\pi$ radians. In that case, FIGS. 8A and 8B would be modified to yield FIG. 8C.

(The Signal-to-Noise Ratio)—The signal-to-noise ratio is defined as the ratio of (½) the mean square signal amplitude to noise variance. The mean square signal is given by $$\text{mean square signal} = \left(\frac{1}{2}\right)E[A^2(t_i)] \tag{6.1.1}$$

$$\text{noise variance} = \sigma_n^2 = \text{var}(n_c(t_i)) = \text{var}(n_s(t_i)) = \left(\frac{1}{2}\right)\text{var}[\tilde{x}(t_i)] \tag{6.1.2}$$

The reason for using the term "mean square signal" is that the RCS may be a randomly varying quantity, such as in the models treated earlier. The "real" values of signal and noise do not matter in the simulation except for determining such parameters as a noise threshold for controlling false alarms. Even here, it is the ratio of threshold to noise that matters, not the specific values themselves.

(Empirical Cross Sections)—The analysis above and FIGS. 8A, 8B and 8C hold for empirical or measured sequences of $B(t_i)$, the observed sequence of RCS. In many situations, all that is known is the sequence of RCS values. All that is required is that any noise accompanying the input, represented by $B(t_i)$ in FIGS. 8A, 8B and 8C, be essentially free of noise, compared to the noise source injected after the square root operation. However, because of the fact that the actual complex envelope, complete with signal phase, the process of signal insertion given by those figures has that arbitrariness associated with it.

(Coherent Processing)—Coherent processing means processing upon the complex envelope of signal plus noise. An example is the application of the complex envelope of signal plus noise to a bank of Doppler filters on the discrete time equivalent. In any case, the initial phase of a sequence of pulses of signal complex envelope is of no consequence. What matters is the phase progression from pulse to pulse. For the simulation of such a progression, FIG. 8C would be modified so that the phase θ would be a function of time and therefore can be written as $$\theta(t_i) = \theta_o + \theta_v(t_i). \quad (7.0.1)$$

Figure 9:
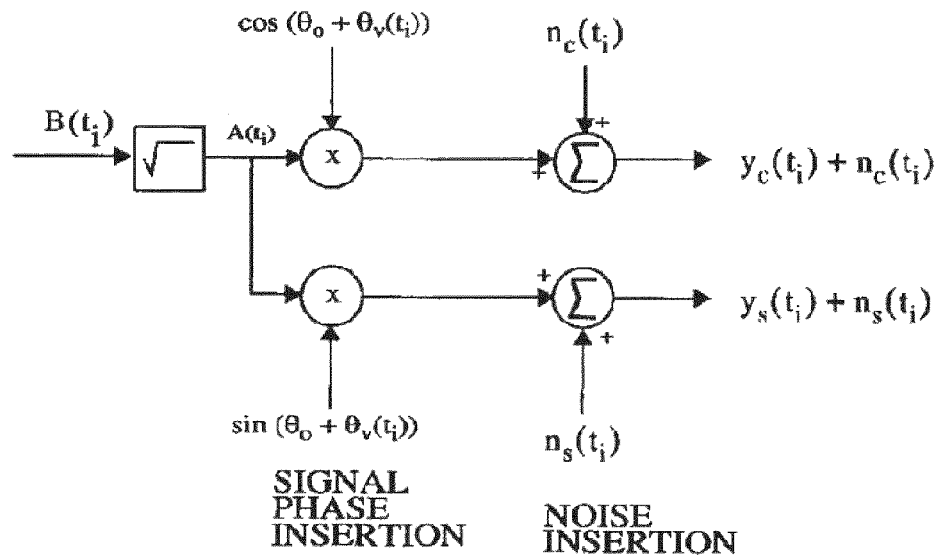
FIG. 9 shows a block diagram of the method for simulating the complex envelope of moving target signal plus noise.

This is illustrated in FIG. 9 for arbitrary target RCS fluctuation.

$\theta_o$=initial phase (arbitrary)

$$\theta_v(t_i) = \text{variable phase}, \quad (7.0.2)$$

where θ is induced by varying target range. Since the initial phase is arbitrary, the simulation expressed by FIG. 9 can be applied no matter how the amplitude variation $A(t_i)$ is obtained.

FIG. 9 is a block diagram of the method of simulating the complex envelope of moving target signal plus noise. The time variable signal phase is $\theta(t_i)=\theta_o+\theta_v(t_i)$ where $\theta_o$ is the initial phase and is arbitrary and $\theta_v(t_i)$ is the variable phase and is induced by the changing target range. As stated, the variable component $\theta_v(t_i)$ of the phase is induced by the variation of target range, so that arbitrary motion could be simulated, including closing speed, closing acceleration, etc. Nevertheless, whatever phase variation has been induced by target motion around its center of gravity is lost.

Figure 10:
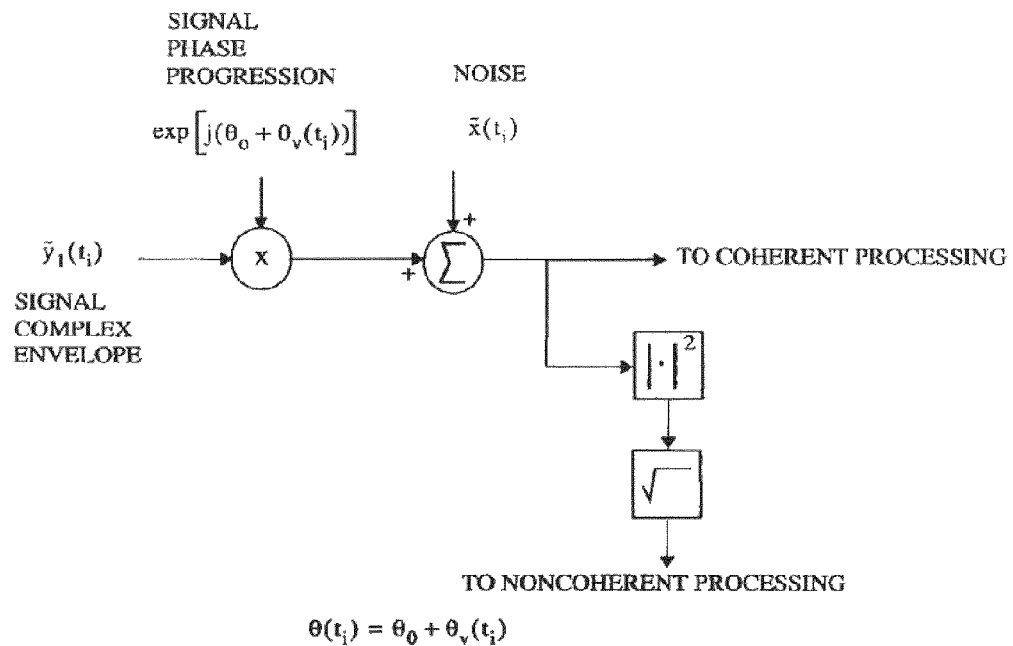
FIG. 10 shows a block diagram of the method for simulating the phase progression applied to the signal complex envelope.

(Coherent Processing and Arbitrary Signal Complex Envelope)—The discussion above and FIG. 9 show how the complex envelope of a signal, with arbitrary Doppler shift can be simulated given only the sequence of RCS values. The same idea can be applied to the simulations of the four Swerling models and the general chi-square fluctuation models. All that is required is that the phase progression $$\theta(t_i) = \theta_o + \theta_v(t_i)$$

be applied to the complex envelope as illustrated in the block diagram of FIG. 10, which is simply an extension of FIG. 6A. FIG. 10 illustrates simulating the phase progression applied to the signal complex envelope where $\theta_o$=arbitrary initial phase and $\theta_v(t_i)$=phase progression induced by changing range. In this instance, the phase progression is applied to the signal complex envelope that has no phase progression, just the phase characteristics of its intrinsic fluctuation.

(Range Glint)—The addition of range glint to the simulated radar echo can be made in a straightforward manner, although it may not, at first, seem possible. Range glint refers to the apparent change in range of a target of small range extent. Ordinarily if a target echo has a range extent smaller than the nominal range resolution of the wave-form, it is treated as a point scatterer. This is the basis—small size—that is the basis of all the target models treated here. However, no real radar target is a single point scatterer. A real radar target will consist of a number of scattering points whose relative range locations, sizes, electrical properties, etc., are generally unknown. In fact, because of multiple reflections on or in the target, the electrical length is frequently greater than the projected physical length. As the target changes its orientation with respect to the radar, these scattering points, or "scattering centers", change relative positions, amplitudes and phases. The composite response, after any form of single pulse filtering (e.g., pulse compression) shows a maximum return that varies from pulse to pulse. This phenomenon is the "range glint".

Figure 11:
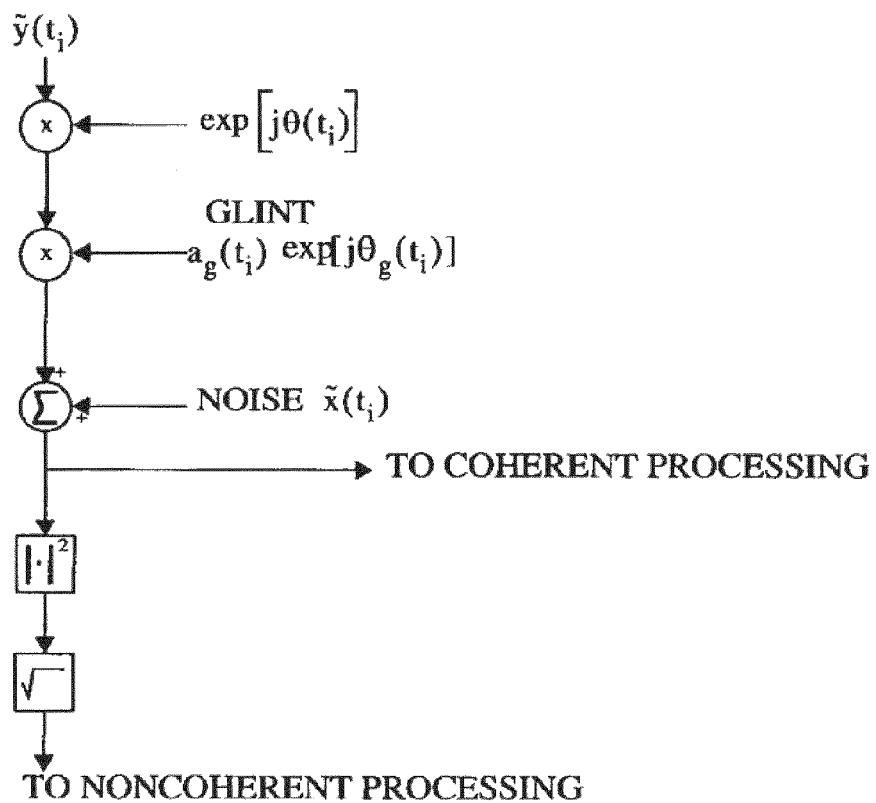
FIG. 11 illustrates the process of modeling the range glint characteristics.

At any given range sampling point, the value of the echo will vary in amplitude and phase caused by the range glint. We treat the echo as a point return in our simulation. Therefore, at the point in time at which we are looking at the echo and noise, there is another perturbation arising from glint. However, this perturbation is not additive. It is multiplicative. Therefore, the effect is imposed on the signal complex envelope as a multiplication, as is the signal phase progression shown in FIG. 10. FIG. 11 illustrates the process of modeling the range glint characteristics, which is simply an extension of FIG. 10. Now the question arises as to the nature of the glint complex envelope. There is very little information about this although there has been some work in estimating the extent of radar glint. (See, for example, J. H. Dunn et al., "Phenomena of scintillation noise in radar tracking systems", Proc. IRE, vol. 47, pp. 855-863, May 1959, the disclosure of which is incorporated herein by reference). Range glint is recognized as a random process and some information has been gathered experimentally. Dunn, et al. give a value of 0.8×object length for the rms value of the range glint variation. On the other hand, Kharilas gives a value of 0.35 $L_R$, where $L_R$ is the radial extent of the target. (See P. J. Kahrilas, Electronic Scanning Radar Systems (ESRS) Design Handbook, Dedham, Mass.: Artech House, Inc., p. 234 (1975)). Barton gives the value $L_R/3$ (see D. K. Barton and H. R. Ward, Handbook of Radar Measurement, Englewood Cliffs, N.J.: Prentice Hall Inc. 1969; Section 6.1), which is essentially the same as that given by Kharilas quoted above.

FIG. 11 illustrates imposition of range glint on the radar echo signal where $$\theta(t_i) = \theta_o + \theta_v(t_i),$$

$a_g(t_i)$=amplitude of glint fluctuation, and $\theta_g(t_i)$=phase of glint fluctuation.

If range glint is to be modeled as a random process, we need to know the probability density function of the glint. The first probability density function of range glint has been determined by Howard and Lewis (D. D. Howard and B. L. Lewis, "Tracking radar external range noise measurement and analysis", Naval Res. Lab. Rpt 4602, Aug. 31, 1955) and also reported by Barton and Ward. It is well approximated by a Gaussian curve. Of course, the first probability density function is insufficient to describe the process. In the absence of other information, I propose modeling the range glint process as a stationary complex Gaussian process with zero mean and statistically independent from pulse to pulse. The standard deviation of the process (same as the rms value) is to be taken as 0.35 times the physical length. Admittedly, this assumption of statistical independence is purely a guess, since I could find nothing in the literature concerning this aspect.

(Other Target Fluctuations)—The set of possible target fluctuations is very large. A few of these have been so far treated in this report. In all of the models, the target has been treated as a point reflector. To consider range extended targets is beyond the scope of this except for consideration of those range extended targets whose fluctuations can be treated in terms of an equivalent point target fluctuation. An example is a target exhibiting precession and mutation with the radar range resolution interval being larger than the target's range extent. To go deeply into the subject of range extended targets is beyond the scope of this report. However, for those cases where the target may be considered as a point reflector there is one general type of fluctuation that can be simulated fairly easily; that is the case where the complex envelope fluctuation process is a wide sense stationary random process and is therefore described by its autocorrelation function having a single argument. The autocorrelation function in this case is the sum of two terms:

$$|m|^2 + R_{\tilde{y}}(\tau) \tag{8.0.1}$$

where m is the mean value of the complex envelope process $\tilde{y}(t)$, and $R_{\tilde{y}}(\tau)$ is the autocovariance function. The process description is not yet complete because the probability density function is not specified. Therefore, when only the autocorrelation function is given, it is common to assume that the echo sequence is a sample function of a stationary complex Gaussian process. The particular type of fluctuation that is treated here is one that can be described as the sum of a number of sinusoids with random, uncorrelated, amplitudes and initial phases. Such a type of fluctuation is a good model for such periodicities as precession and mutation.

Let's consider, first, a motion consisting of a single sinusoid. For the complex envelope, the motion is an exponential as follows:

$$\tilde{y}(t) = a_1 \exp[j(\omega_1 t + \theta_1)], \; t = iT, \; 0 \leq i \leq N \tag{8.0.2}$$

where:
- $a_1$ is a complex random variable, but independent of $\theta$
- $\theta_1$ is the initial phase,
- $\omega_1 = 2\pi \times$ frequency of the sinusoidal motion The phase angle $\theta_1$ is assumed to be uniformly distributed over the interval $(-\pi, \pi)$ radians. It is easy to see that $$E[\tilde{y}(t)] = 0 \tag{8.0.3}$$

Therefore, $$R_{\tilde{y}}(T) = E[\tilde{y}(t)\tilde{y}^* (t-\tau)] \tag{8.0.4}$$

$$= \{E|a_1|^2 \exp(j\omega_1 \tau + \theta_1 - j\omega_1 \tau - \theta_1 + j\omega_1 \tau)\}$$

$$= E|a_1|^2 \exp(j\omega_1 \tau)$$

Here, of course, $\tau$ will be multiples of the repetition period T:

$$\tau = iT \tag{8.0.5}$$

We shall deal with a finite segment of $\tau: \tau = iT;\; i=1, \ldots, N$.

Now, consider $\tilde{y}(t)$ having two component exponentials:

$$\tilde{y}(t) = a_1 \exp[j(\omega_1 t + \theta_1)] + a_2 \exp[j(\omega_2 t + \theta_2)] \tag{8.0.6}$$

Where $a_1$ and $a_2$ are statistically independent, as are $\theta_1$ and $\theta_2$. Also, we assume that $\theta_1$ and $\theta_2$ are each uniformly distributed over $(-\pi, \pi)$. Then it is easily found that the autocovariance function is:

$$R_{\tilde{y}}(\tau) = E|a_1|^2 \exp(j\omega_1 \tau) + E|a_2|^2 \exp(j\omega_2 \tau] \tag{8.0.7}$$

In general, for a sum of exponentials with statistically independent amplitudes $a_k$ and phases $\theta_k$, the sum autocovariance function is $$R_{\tilde{y}}(\tau) = \Sigma_{k=1}^K E|a_k|^2 \exp(j\omega_k \tau). \tag{8.0.8}$$

(The Covariance Matrix and Its Decomposition)—In order to create a sequence of duration N values, we have to deal with the covariance matrix of those values and with its decomposition into the so-called "Cholesky factors". The autocovariance sequence at time instants kT is written as:

$$R_{\tilde{y}}(kT) \tag{8.1.1}$$

The covariance matrix $R_{\tilde{y}}$ is constructed from (8.1.0) as follows:

$$R_{\tilde{y}} = \begin{bmatrix} R_{\tilde{y}}(0) & R_{\tilde{y}}(T) & R_{\tilde{y}}(2T) & \ldots & R_{\tilde{y}}([N-1]T) \\ R_{\tilde{y}}^*(T) & R_{\tilde{y}}(0) & R_{\tilde{y}}(T) & \ldots & R_{\tilde{y}}([N-2]T) \\ R_{\tilde{y}}^*(2T) & R_{\tilde{y}}^*(T) & R_{\tilde{y}}(0) & \ldots & R_{\tilde{y}}([N-3]T) \\ & & \vdots & & \\ R_{\tilde{y}}^*([N-1]T) & R_{\tilde{y}}^*([N-2]T) & R_{\tilde{y}}^*([N-3]T) & \ldots & R_{\tilde{y}}(0) \end{bmatrix} \tag{8.1.2}$$

We note that $R_{\tilde{y}}$ is Hermitian and Toeplitz.

The next step that is needed is to apply the Cholesky decomposition to the covariance matrix to find its factors in the following form $$R_{\tilde{y}} = DD^H, \tag{8.1.3}$$

where the matrix $\underline{D}$ is a lower triangular matrix:

$$D = \begin{bmatrix} D_{11} & 0 & 0 & \ldots & 0 \\ D_{21} & D_{22} & 0 & \ldots & 0 \\ D_{31} & D_{32} & D_{33} & \ldots & 0 \\ & & \vdots & & \\ D_{N1} & D_{n2} & D_{N3} & \ldots & D_{NN} \end{bmatrix} \tag{8.1.4}$$

and the elements of D are found from the Cholesky recursion (H. Urkowitz, SIGNAL THEORY AND RANDOM PROCESSES, Dedham, Mass., Artech House, Inc., (1983), the contents of which are incorporated herein by reference) in the following way:

$$D_{11} + \sqrt{R_{\tilde{y}}(0)} = \sigma_{\tilde{y}} = \text{standard deviation of } \tilde{y}(t) \tag{8.1.5}$$

$$D_{j1} = R_{\tilde{y}}^*(jT), \; 1 \leq j \leq N$$

$$D_{ji} = \left[ R_{\tilde{y}}^*([i-j]T) - \sum_{k=1}^{i-1} D_{ik}^* D_{jk} \right] / R_{\tilde{y}}(0)$$

$$D_{jj}^2 = R_{\tilde{y}}(0) - \sum_{k=1}^{j-1} |D_{jk}|^2$$

(Generating the Desired Sequence)—Suppose we start with the complex finite sequence $$\underline{\tilde{x}} = [\tilde{x}_1, \tilde{x}_2, \ldots \tilde{x}_N]^T \tag{8.2.1}$$

with the identity matrix $\underline{I}$ as its covariance matrix.

$$R_{\tilde{x}} = \underline{I} \tag{8.2.2}$$

Figure 12:
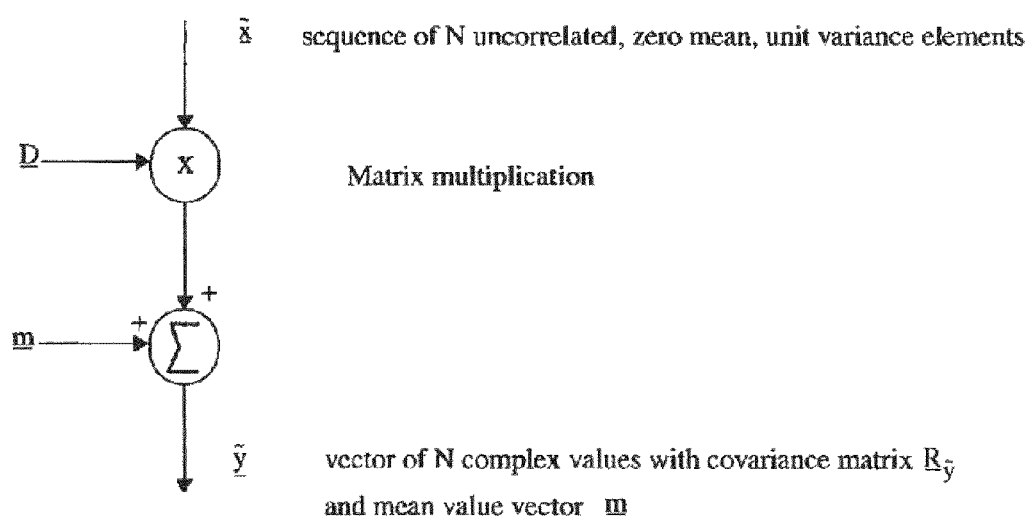
FIG. 12 illustrates the process of generating the complex envelope sequence of simulated radar target echo pulses.

This means that x has uncorrelated components. We want to convert this vector to a vector $\underline{\tilde{y}}$ having the covariance matrix $\overline{R_{\tilde{y}}}$. This is done by the following procedure.

$$\underline{\tilde{x}} \rightarrow \underline{\tilde{y}} \quad (8.2.3)$$

by $$D\underline{\tilde{x}} = \underline{\tilde{y}} \text{(with mean value absent)} \quad (8.2.4)$$

where the transformation matrix D is obtained from $\overline{R\tilde{y}}$ by a Cholesky decomposition as shown by the equation (8.1.4). The procedure is illustrated in FIG. 12 with the addition of the mean value vector $\underline{m}$. Then the desired output vector $\underline{\tilde{y}}$ will be $$\underline{\tilde{y}} = D\underline{\tilde{x}} + \underline{m} \quad (8.2.5)$$

(Obtaining the Complex Vector $\tilde{x}$)—From what has gone before, we start with a complex vector $\tilde{x}$ having uncorrelated components with unit variance. From the discussion earlier, we choose to start with a zero mean complex Gaussian sequence. This may be obtained from the MATLAB command real_x=randn(n)
imag_x=randn(n)

The present disclosure provides methods for simulating many types of radar target echoes. These have been simulated in complex envelope so that bandpass noise could be properly added to the signal. Adding noise to the radar target echo signal at complex envelope level is preferred because that results in a more realistic noisy radar target echo signal. In the case of the Swerling targets I, II, III, IV and block correlated, the complex envelope of target echo has real and imaginary parts that are themselves Gaussian processes. Noise would be added coherently to the Gaussian complex signal envelopes and the sums would be squared and added in the appropriate fashion to get envelopes that may now be treated noncoherently, e.g., noncoherent integration.

The methods so described can be applied to any generalized chi-square cross section fluctuation with an integral number of duo-degrees of freedom. RCS fluctuations with a non-integral number of duo degrees of freedom cannot be obtained with underlying Gaussian complex envelopes; one must fall back on the general method of constructing the complex envelope when only the amplitude process is known. This is done by taking the square root of the RCS versus time, splitting the result into two parts, and multiplying by the cosine and by the sine of an arbitrary phase angle.

Such an addition of arbitrary signal phase is an expression of ignorance. Since the phase fluctuation is unknown, it is ignored and an artificial phase fluctuation is imposed. Therefore, it is preferred that, in this case, such artificially created complex envelopes be used only to get the proper insertion of noise for subsequent noncoherent operation, such as noncoherent integration and tracking. An additional perturbation that can be modeled is "range glint". Range glint arises from the varying amplitudes and phases of the scattering centers of the target as it changes its orientation with respect to the radar. This effect is noted even for objects that have small range extent compared to nominal range resolution of the radar. Unlike the conventional knowledge disclosed in the literature, in which range glint is taken as additive noise, in the present disclosure range glint is modeled as a modulation or multiplicative process. Thus, the inventor has modeled range glint as a multiplicative process shown in FIG. 11. The present disclosure also provides a short section on simulating other target fluctuations. In particular, an outline of simulating a motion consisting of a mean value plus sinusoidal motion consisting of a number of fixed frequency components but having random starting phases is shown. Random amplitudes may also be considered. Such motions are characteristic of precession and mutation.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for determining target echo detection efficacy of a signal processing algorithm of a radar system comprising:
  generating, in a signal processor, a simulated noise complex envelope sequence;
  generating a simulated radar target echo signal complex envelope pulse sequence, wherein generating the simulated radar target echo signal complex envelope sequence comprises the steps of:
    generating a sequence of uncorrelated complex envelope values;
    multiplying the generated sequence of uncorrelated complex envelope values by a transformation matrix, the transformation matrix being based on an autocorrelation function of a fluctuating target process;
    adding a mean value vector to the product of the sequence of uncorrelated complex envelope values and the transformation matrix, to calculate an output vector containing the simulated radar target echo signal complex envelope sequence;
  adding the simulated noise complex envelope sequence to the simulated radar target echo signal complex envelope pulse sequence, thereby producing simulated noisy radar target echo signal complex envelope sequence;
  inputting the simulated noisy radar target echo signal complex envelope sequence into the signal processing algorithm; and
  analyzing the signal processing algorithm's output to determine target echo detection efficacy of the signal processing algorithm.

2. The method of claim 1, wherein the simulated radar target echo signal complex envelope pulse sequence comprises Chi-Square radar target models.

3. The method of claim 2, wherein the Chi-Square radar target models comprise at least one of Swerling target models.

4. A method for simulating radar target echo signal comprising:
  generating, in a signal processor, a simulated noise complex envelope sequence;
  generating a simulated radar target echo signal complex envelope pulse sequence, wherein generating the simulated radar target echo signal complex envelope sequence comprises the steps of:
    generating a sequence of uncorrelated complex envelope values;
    multiplying the generated sequence of uncorrelated complex envelope values by a transformation matrix, the transformation matrix being based on an autocorrelation function of a fluctuating target process;
    adding a mean value vector to the product of the sequence of uncorrelated complex envelope values and the transformation matrix, to calculate an output vector containing the simulated radar target echo signal complex envelope sequence; and
  adding the simulated noise complex envelope sequence to the simulated radar target echo signal complex envelope pulse sequence, thereby producing a simulated noisy radar target echo signal complex envelope sequence.

5. The method of claim 4, wherein the simulated radar target echo signal complex envelope pulse sequence comprises Chi-Square radar target models.

6. The method of claim 5, wherein the Chi-Square radar target models comprise at least one of Swerling target models.

7. The method of claim 4, wherein said transformation matrix is calculated by performing the steps of:
   constructing a covariance matrix of covariance values at specific time instants;
   factoring the covariance matrix by applying a Cholesky decomposition to the covariance matrix, wherein one of the factors is a lower triangular matrix defining the transformation matrix.

8. The method of claim 7, wherein the covariance matrix is constructed according to:

$$\begin{bmatrix} R_{\tilde{y}}(0) & R_{\tilde{y}}(T) & R_{\tilde{y}}(2T) & \ldots & R_{\tilde{y}}([N-1]T) \\ R_{\tilde{y}}^*(T) & R_{\tilde{y}}(0) & R_{\tilde{y}}(T) & \ldots & R_{\tilde{y}}([N-2]T) \\ R_{\tilde{y}}^*(2T) & R_{\tilde{y}}^*(T) & R_{\tilde{y}}(0) & \ldots & R_{\tilde{y}}([N-3]T) \\ \vdots & \vdots & \vdots & \ddots & \vdots \\ R_{\tilde{y}}^*([N-1]T) & R_{\tilde{y}}^*([N-2]T) & R_{\tilde{y}}^*([N-3]T) & \ldots & R_{\tilde{y}}(0) \end{bmatrix}$$

wherein $R_{\tilde{y}}(kT)$ is a covariance sequence at time kT and wherein $R_{\tilde{y}}$ is Hermitian and Toeplitz.

* * * * *